(12) United States Patent
Sun et al.

(10) Patent No.: US 11,399,377 B2
(45) Date of Patent: Jul. 26, 2022

(54) METHOD FOR PROCESSING QUALITY OF SERVICE FLOW, AND COMMUNICATION DEVICE

(71) Applicants: China Mobile Communication Co., Ltd Research Institute, Beijing (CN); China Mobile Communications Group Co., Ltd., Beijing (CN)

(72) Inventors: Junshuai Sun, Beijing (CN); Yingying Wang, Beijing (CN); Xueyan Huang, Beijing (CN); Xingyu Han, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 16/957,500

(22) PCT Filed: Dec. 24, 2018

(86) PCT No.: PCT/CN2018/123052
§ 371 (c)(1),
(2) Date: Jun. 24, 2020

(87) PCT Pub. No.: WO2019/128915
PCT Pub. Date: Jul. 4, 2019

(65) Prior Publication Data
US 2021/0076393 A1    Mar. 11, 2021

(30) Foreign Application Priority Data
Dec. 28, 2017  (CN) .......................... 201711456611.7

(51) Int. Cl.
*H04W 72/08* (2009.01)
*H04W 28/06* (2009.01)

(52) U.S. Cl.
CPC ......... *H04W 72/087* (2013.01); *H04W 28/06* (2013.01)

(58) Field of Classification Search
CPC ........................... H04W 72/087; H04W 28/06
(Continued)

(56) References Cited

U.S. PATENT DOCUMENTS 10,313,266 B2 * 6/2019 Tan .......................... H04L 45/64
10,805,849 B2 * 10/2020 Fang ..................... H04W 36/08
(Continued)

FOREIGN PATENT DOCUMENTS

CN    101043304 A    9/2007
CN    101150498 A    3/2008
(Continued)

OTHER PUBLICATIONS

Chinese Office Action for Chinese Application No. 201711456611. 7, dated May 7, 2020, 9 pages.
(Continued)

*Primary Examiner* — Margaret G Mastrodonato
(74) *Attorney, Agent, or Firm* — Price Heneveld LLP

(57) ABSTRACT

A method of processing a quality-of-service flow and a communication device are provided. The method includes: acquiring a first identifier of a target quality-of-service flow; creating a second identifier of the target quality-of-service flow according to the first identifier of the target quality-of-service flow; wherein, a length of the second identifier of the target quality-of-service flow is less than or equal to a length of the first identifier of the target quality-of-service flow.

20 Claims, 1 Drawing Sheet

```
┌─────────────────────────────────────────────┐
│ Acquiring an identifier of a Data Radio Bearer │  /21
│ (DRB) and a second identifier of a target      │
│ Quality-of-Service flow mapped to the DRB      │
└─────────────────────────────────────────────┘
                      │
                      ▼
┌─────────────────────────────────────────────┐
│ Determining a first identifier of the target   │
│ Quality-of-Service flow according to the       │  /22
│ identifier of the DRB and the second identifier│
│ of the target Quality-of-Service flow          │
└─────────────────────────────────────────────┘
```

(58) Field of Classification Search
USPC .......................................... 370/329; 455/450.1
See application file for complete search history.

(56) References Cited

U.S. PATENT DOCUMENTS

| | | | |
|---|---|---|---|
| 11,025,550 B2* | 6/2021 | Jiang | H04W 28/24 |
| 2009/0213779 A1 | 8/2009 | Zhang et al. | |
| 2013/0111044 A1* | 5/2013 | Cherian | H04W 76/00 |
| | | | 709/228 |
| 2013/0166687 A1 | 6/2013 | Hirano | |
| 2015/0263868 A1 | 9/2015 | Zhou et al. | |
| 2017/0250829 A1* | 8/2017 | Lu | H04L 41/0893 |
| 2017/0317894 A1 | 11/2017 | Dao et al. | |
| 2018/0234903 A1* | 8/2018 | Jheng | H04W 36/165 |
| 2018/0279161 A1* | 9/2018 | Chen | H04M 15/66 |
| 2018/0295642 A1* | 10/2018 | Miao | H04W 72/1289 |
| 2019/0132765 A1* | 5/2019 | Cho | H04W 28/0215 |
| 2019/0223152 A1 | 7/2019 | Ke et al. | |
| 2019/0289528 A1* | 9/2019 | Lou | H04W 12/69 |
| 2020/0221367 A1* | 7/2020 | Hashemi | H04W 40/246 |
| 2020/0322845 A1* | 10/2020 | Jeong | H04W 28/18 |

FOREIGN PATENT DOCUMENTS

| | | |
|---|---|---|
| CN | 107371215 A | 11/2017 |
| WO | 2019158699 A1 | 8/2019 |

OTHER PUBLICATIONS

"Use of Shorter QoS Flow ID, HiSilicon Huawei", 3GPP TSG-RAN2 Meeting #99, Aug. 21-25, 2017; R2-1708934; Berlin, Germany Revision of R2-1706784.

Fernando Rodini, "QoS/QoE Developments in 4G-IoT & 5G Technologies," URL:https://www.i.tu.int/en/ITU-T/Workshops-and-Seminars/qos/201711/Documents/S10_Rodini.pdf, Nov. 27, 2017 (11 pages).

ZTE, Sanechips, "Discussion on QoS flow-DRB remapping," 3GPP TSG-RAN WG2 Meeting #00, R2-1712608, Reno, NV Nov. 27-Dec. 1, 2017 (4 pages).

* cited by examiner

METHOD FOR PROCESSING QUALITY OF SERVICE FLOW, AND COMMUNICATION DEVICE

CROSS-REFERENCE TO RELATED APPLICATION

This application is the U.S. national phase of PCT Application No. PCT/CN2018/123052 filed on Dec. 24, 2018, which claims priority to a Chinese Patent Application No. 201711456611.7, filed in China on Dec. 28, 2017, the disclosures of which are incorporated herein by reference in their entirety.

TECHNICAL FIELD

The present disclosure relates to the field of communication technology, and in particular, related to a method of processing a quality-of-service flow and a communication device.

BACKGROUND

A mapping requirement and a configuration requirement for a Quality-of-Service Flow (QoS Flow) and a Data Radio Bearer (DRB) are specified in a Service Data Adaption Protocol (SDAP) in the related art.

In the related art, a mapping configuration of the QoS Flow and the DRB is still under discussion, and a configuration of a mapping signaling for the Quality-of-Service Flow ID (QoS Flow ID, QFI) and a Data Radio Bearer ID (DRB ID) is unclear. A conventional scheme is to map a QoS Flow ID carried by a core network directly to a DRB, that is, the QoS Flow ID written in a header of a protocol data unit based on the service data adaptation protocol (SDAP PDU) is a QoS Flow ID carried by a packet transmitted by the core network. This approach causes the QoS Flow ID carried by each DRB to be over long, resulting in a large overhead for a header length of the SDAP PDU.

SUMMARY

A method of processing a quality-of-service flow is provided in some embodiments of the present disclosure. The method includes: acquiring a first identifier of a target quality-of-service flow; creating a second identifier of the target quality-of-service flow according to the first identifier of the target quality-of-service flow; wherein, a length of the second identifier of the target quality-of-service flow is less than or equal to a length of the first identifier of the target quality-of-service flow.

Wherein, the first identifier of the target quality-of-service flow is an identifier allocated by a core network for the target quality-of-service flow; the second identifier of the target quality-of-service flow is an offset of an index of a quality-of-service flow mapped to a same Data Radio Bearer (DRB) within the DRB.

Wherein, a value of the second identifier of the target quality-of-service flow ranges from 0 to m−1, and m is a maximum quantity of quality-of-service flows capable of being carried on a Data Radio Bearer (DRB) mapped with the target quality-of-service flow.

Wherein, acquiring the first identifier of the target quality-of-service flow includes: receiving a Service Data Unit (SDU) sent by a first device; determining an identifier of a target quality-of-service flow carrying the SDU as the first identifier of the target quality-of-service flow.

Wherein, creating the second identifier of the target quality-of-service flow according to the first identifier of the target quality-of-service flow includes: creating the second identifier of the target quality-of-service flow according to the first identifier of the target quality-of-service flow, an identifier of a Data Radio Bearer (DRB) mapped with the target quality-of-service flow, and a maximum quantity of quality-of-service flows capable of being carried on the DRB mapped with the target quality-of-service flow.

Wherein, creating the second identifier of the target quality-of-service flow according to the first identifier of the target quality-of-service flow, the identifier of the DRB mapped with the target quality-of-service flow and the maximum quantity of the quality-of-service flows capable of being carried on the DRB mapped with the target quality-of-service flow includes: creating the second identifier of the target quality-of-service flow according to a first formula, wherein the first formula is: $QFI_2 = QFI_1 - DRB\_ID * Max\_QoSFlow\_Num_{per\_DRB}$; wherein, the $QFI_2$ is the second identifier of the target quality-of-service flow; the $QFI_1$ is the first identifier of the target quality-of-service flow; the $Max\_QoSFlow\_Num_{per\_DRB}$ is the maximum quantity of the quality-of-service flows capable of being carried on the DRB mapped with the target quality-of-service flow; the $DRB\_ID$ is the identifier of the DRB mapped with the target quality-of-service flow.

Wherein, creating the second identifier of the target quality-of-service flow according to the first identifier of the target quality-of-service flow includes: creating the second identifier of the target quality-of-service flow according to a second formula, wherein the second formula is $QFI_2 = QFI_1 \% \ Max\_QosFlow\_Num_{per\_DRB}$; wherein, the $QFI_2$ is the second identifier of the target quality-of-service flow; the $QFI_1$ is the first identifier of the target quality-of-service flow; the $Max\_QoSFlow\_NuM_{per\_DRB}$ is a maximum quantity of quality-of-service flows capable of being carried on a Data Radio Bearer (DRB) mapped with the target quality-of-service flow; % represents a remainder operation.

Wherein, after creating the second identifier of the target quality-of-service flow according to the first identifier of the target quality-of-service flow, the method further includes determining an identifier of a Data Radio Bearer (DRB) mapped with the target quality-of-service flow according to the first identifier of the target quality-of-service flow, determining the DRB mapped with the target quality-of-service flow according to the identifier of the DRB mapped with the target quality-of-service flow, sending a Protocol Data Unit (PDU) to a second device on the DRB mapped with the target quality-of-service flow.

Wherein, the PDU carries header information, and the header information includes the second identifier of the target quality-of-service flow; or the PDU does not carry header information, but there is a preset mapping relationship between the PDU and the second identifier of the target quality-of-service flow.

Wherein, determining the identifier of the DRB mapped with the target quality-of-service flow according to the first identifier of the target quality-of-service flow includes: determining the identifier of the DRB mapped with the target quality-of-service flow according to the first identifier of the target quality-of-service flow, the second identifier of the target quality-of-service flow and a maximum quantity of quality-of-service flows capable of being carried on a DRB mapped with the target quality-of-service flow.

Wherein, determining the identifier of the DRB mapped with the target quality-of-service flow according to the first identifier of the target quality-of-service flow, the second identifier of the target quality-of-service flow and the maximum quantity of the quality-of-service flows capable of being carried on the DRB mapped with the target quality-of-service flow includes: determining the identifier of the DRB mapped with the target quality-of-service flow according to a third formula, wherein the third formula is: $DRB\_ID = QFI_1 - QFI_2/Max\_QoSFlow\_Num_{per\_DRB}$; wherein, the DRB_ID is the identifier of the DRB mapped with the target quality-of-service flow; the $QFI_2$ is the second identifier of the target quality-of-service flow; the $QFI_1$ is the first identifier of the target quality-of-service flow; the $Max\_QoSFlow\_NuM_{per\_DRB}$ is the maximum quantity of the quality-of-service flows capable of being carried on the DRB mapped with the target quality-of-service flow.

Wherein, determining the identifier of the DRB mapped with the target quality-of-service flow according to the first identifier of the target quality-of-service flow includes: determining the identifier of the DRB mapped with the target quality-of-service flow according to a fourth formula, wherein the fourth formula is: $DRB\_ID = \lfloor QFI_1 \div Max\_QoSFlow\_Num_{per\_DRB} \rfloor$; wherein, the DRB_ID is the identifier of the DRB mapped with the target quality-of-service flow; the $QFI_1$ is the first identifier of the target quality-of-service flow; the $Max\_QoSFlow\_Num_{per\_DRB}$ is a maximum quantity of quality-of-service flows capable of being carried on a Data Radio Bearer (DRB) mapped with the target quality-of-service flow; the $\lfloor \ \rfloor$ represents a round-down operation.

A method of processing a quality-of-service flow is further provided in some embodiments of the present disclosure. The method includes: acquiring an identifier of a Data Radio Bearer (DRB) and a second identifier of a target quality-of-service flow mapped to the DRB; determining a first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow.

Wherein, the first identifier of the target quality-of-service flow is an identifier allocated by a core network for the target quality-of-service flow; the second identifier of the target quality-of-service flow is an offset of an index of a quality-of-service flow mapped to a same DRB within the DRB.

Wherein, a value of the second identifier of the target quality-of-service flow ranges from 0 to m−1, the m is a maximum quantity of quality-of-service flows capable of being carried on the DRB mapped to the target quality-of-service flow.

Wherein, acquiring the identifier of the DRB includes: receiving a Protocol Data Unit (PDU) sent by a third device; acquiring an identifier of a DRB carrying the PDU.

Wherein, acquiring the second identifier of the target quality-of-service flow mapped to the DRB includes: parsing the PDU; determining, in a case that the PDU carries header information, an identifier of a quality-of-service flow included in the header information of the PDU as the second identifier of the target quality-of-service flow mapped to the DRB; searching, in a case that the PDU does not carry header information, an identifier of a quality-of-service flow corresponding to the PDU according to a preset mapping relationship, and determining the identifier of the quality-of-service flow corresponding to the PDU as the second identifier of the target quality-of-service flow mapped to the DRB.

Wherein, determining the first identifier of the target quality-of-service flow according to the identifier of the DRB and the second identifier of the target quality-of-service flow includes: determining the first identifier of the target quality-of-service flow according to the identifier of the DRB, the second identifier of the target quality-of-service flow and a maximum quantity of quality-of-service flows capable of being carried on the DRB.

Wherein, determining the first identifier of the target quality-of-service flow according to the identifier of the DRB, the second identifier of the target quality-of-service flow and the maximum quantity of the quality-of-service flows capable of being carried on the DRB includes: determining the first identifier of the target quality-of-service flow according to a fifth formula, wherein the fifth formula is: $QFI_1 = DRB\_ID * Max\_QoSFlow\_Num_{per\_DRB} + QFI_2$; wherein, the $QFI_1$ is the first identifier of the target quality-of-service flow; the DRB_ID is the identifier of the DRB; the $Max\_QoSFlow\_NuM_{per\_DRB}$ is a maximum quantity of quality-of-service flows capable of being carried on the DRB; the $QFI_2$ is the second identifier of the target quality-of-service flow.

Wherein, after determining the first identifier of the target quality-of-service flow according to the identifier of the DRB and the second identifier of the target quality-of-service flow, the method further includes determining the target quality-of-service flow mapped to the DRB according to the first identifier of the target quality-of-service flow, sending a Service Data Unit (SDU) to a fourth device on the target quality-of-service flow.

A communication device is further provided in some embodiments of the present disclosure. The communication device includes a processor and a transceiver, the transceiver is used to perform a following process: acquiring a first identifier of a target quality-of-service flow; the processor is used to perform a following process: creating a second identifier of the target quality-of-service flow according to the first identifier of the target quality-of-service flow; wherein, a length of the second identifier of the target quality-of-service flow is less than or equal to a length of the first identifier of the target quality-of-service flow.

Wherein, the first identifier of the target quality-of-service flow is an identifier allocated by a core network for the target quality-of-service flow; the second identifier of the target quality-of-service flow is an offset of an index of a quality-of-service flow mapped to a same Data Radio Bearer (DRB) within the DRB.

Wherein, a value of the second identifier of the target quality-of-service flow ranges from 0 to m−1, the m is a maximum quantity of quality-of-service flows capable of being carried on a Data Radio Bearer (DRB) mapped with the target quality-of-service flow.

Wherein, the transceiver is further used to receive a service data unit (SDU) sent by a first device; the processor is further used to determine an identifier of a target quality-of-service flow carrying the SDU as the first identifier of the target quality-of-service flow.

Wherein, the processor is further used to create the second identifier of the target quality-of-service flow according to the first identifier of the target quality-of-service flow, an identifier of a Data Radio Bearer (DRB) mapped with the target quality-of-service flow and a maximum quantity of quality-of-service flows capable of being carried on the DRB mapped with the target quality-of-service flow.

Wherein, the processor is further used to create the second identifier of the target quality-of-service flow according to a first formula, wherein the first formula is: $QFI_2 = QFI_1 -$ DRB_ID*Max_QoSFlow_Num$_{per\_DRB}$; wherein, the QFI$_2$ is the second identifier of the target quality-of-service flow; the QFI$_1$ is the first identifier of the target quality-of-service flow; the Max_QoSFlow_Num$^{per\_DRB}$ is the maximum quantity of quality-of-service flows capable of being carried on the DRB mapped with the target quality-of-service flow; the DRB_ID is the identifier of the DRB mapped with the target quality-of-service flow.

Wherein, the processor is further used to create the second identifier of the target quality-of-service flow according to a second formula, wherein the second formula is: QFI$_2$=QFI$_1$% Max_QosFlow_Num$_{per\_DRB}$; wherein, the QFI$_2$ is the second identifier of the target quality-of-service flow; the QFI$_1$ is the first identifier of the target quality-of-service flow; the Max_QoSFlow_NuM$_{per\_DRB}$ is a maximum quantity of quality-of-service flows capable of being carried on a Data Radio Bearer (DRB) mapped with the target quality-of-service flow; % represents a remainder operation.

Wherein, the processor is further used to determine an identifier of a Data Radio Bearer (DRB) mapped with the target quality-of-service flow according to the first identifier of the target quality-of-service flow; determine the DRB mapped with the target quality-of-service flow according to the identifier of the DRB mapped with the target quality-of-service flow, send a Protocol Data Unit (PDU) to a second device on the DRB mapped with the target quality-of-service flow.

Wherein, the PDU carries header information, and the header information includes the second identifier of the target quality-of-service flow; or the PDU does not carry header information, and there is a preset mapping relationship between the PDU and the second identifier of the target quality-of-service flow.

Wherein, the processor is further used to determine the identifier of the DRB mapped with the target quality-of-service flow according to the first identifier of the target quality-of-service flow, the second identifier of the target quality-of-service flow, and a maximum quantity of quality-of-service flows capable of being carried on the DRB mapped with the target quality-of-service flow.

Wherein, the processor is further used to determine the identifier of the DRB mapped with the target quality-of-service flow according to a third formula, wherein the third formula is: DRB_ID=QFI$_1$−QFI$_2$/Max_QoSFlow_Num$_{per\_DRB}$; wherein, the DRB_ID is the identifier of the DRB mapped with the target quality-of-service flow; the QFI$_2$ is the second identifier of the target quality-of-service flow; the QFI$_1$ is the first identifier of the target quality-of-service flow; the Max_QoSFlow_NuM$_{per\_DRB}$ is the maximum quantity of quality-of-service flows capable of being carried on the DRB mapped with the target quality-of-service flow.

Wherein, the processor is further used to perform the following process: determining the identifier of the DRB mapped with the target quality-of-service flow according to a fourth formula, wherein the fourth formula is: DRB_ID=⌊QFI$_1$÷Max_QoSFlow_Num$_{per\_DRB}$⌋; wherein, the DRB_ID is the identifier of the DRB mapped with the target quality-of-service flow; the QFI$_1$ is the first identifier of the target quality-of-service flow; the Max_QoSFlow_Num$_{per\_DRB}$ is a maximum quantity of quality-of-service flows capable of being carried on the DRB mapped with the target quality-of-service flow; the ⌊ ⌋ represents a round-down operation.

A communication device is provided in some embodiments of the present disclosure. The method includes a processor and a transceiver, wherein the transceiver is used to perform a following process: acquiring an identifier of a Data Radio Bearer (DRB) and a second identifier of a target quality-of-service flow mapped to the DRB; the processor is used to perform a following process: determining a first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow.

Wherein, the first identifier of the target quality-of-service flow is an identifier allocated by a core network for the target quality-of-service flow; the second identifier of the target quality-of-service flow is an offset of an index of a quality-of-service flow mapped to a same DRB within the DRB.

Wherein, a value of the second identifier of the target quality-of-service flow ranges from 0 to m−1, the m is a maximum quantity of quality-of-service flows capable of being carried on the DRB mapped with the target quality-of-service flow.

Wherein, the transceiver is further used to receive a Protocol Data Unit (PDU) sent by a third device; the processor is further used to acquire an identifier of a DRB carrying the PDU.

Wherein, the processor is further used to: parse the PDU; determine, in a case that the PDU carries header information, an identifier of a quality-of-service flow included in the header information of the PDU as the second identifier of the target quality-of-service flow mapped to the DRB; search, in a case that the PDU does not carry header information, an identifier of the quality-of-service flow corresponding to the PDU according to a preset mapping relationship, and determine the identifier of the quality-of-service flow corresponding to the PDU as the second identifier of the target quality-of-service flow mapped to the DRB.

Wherein, the processor is further used to: determine the first identifier of the target quality-of-service flow according to the identifier of the DRB, the second identifier of the target quality-of-service flow and a maximum quantity of quality-of-service flows capable of being carried on the DRB.

Wherein, the processor is further used to: determine the first identifier of the target quality-of-service flow according to a fifth formula, wherein the fifth formula is: QFI$_1$=DRB_ID*Max_QoSFlow_Num$_{per\_DRB}$+QFI$_2$; wherein, the QFI$_1$ is the first identifier of the target quality-of-service flow; the DRB_ID is the identifier of the DRB; the Max_QoSFlow_NuM$_{per\_DRB}$ is the maximum quantity of quality-of-service flows capable of being carried on the DRB; the QFI$_2$ is the second identifier of the target quality-of-service flow.

Wherein, the processor is further used to: determine the target quality-of-service flow mapped to the DRB according to the first identifier of the target quality-of-service flow; the transceiver is further used to send a Service Data Unit (SDU) to a fourth device on the target quality-of-service flow.

A communication device is provided in some embodiments of the present disclosure. The communication device includes a storage, a processor, and a computer program stored on the storage and executable by the processor, wherein, in a case that the program is executed by the processor, the processor implements steps of the method of processing the quality-of-service flow described above.

A computer readable storage medium is further provided in some embodiments of the present disclosure. The computer readable storage medium stores therein a computer program, wherein when the program is executed by a processor, the processor implements steps of the method of processing the quality-of-service flow described above.

DETAILED DESCRIPTION

In order to make technical problems to be solved, technical solutions and advantages of the present disclosure clearer, the present disclosure will be clearly and completely described in detail below with reference to the drawings and specific embodiments.

Figure 1:
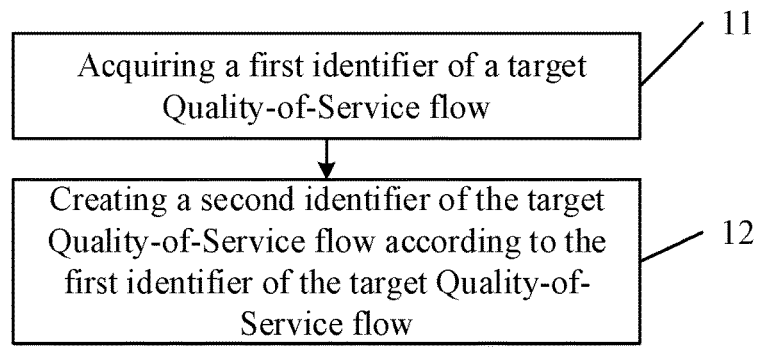
FIG. 1 is a first schematic flowchart illustrating steps of a method of processing a quality-of-service flow provided in some embodiments of the present disclosure.

As shown in FIG. 1, a method of processing a quality-of-service flow is provided in some embodiments of the present disclosure, and the method includes steps 11-12.

Step 11: acquiring a first identifier of a target quality-of-service flow.

In the step, the first identifier of the target quality-of-service flow is an identifier allocated by a core network for the target quality-of-service flow. A non-access stratum (NAS) level described in Section 12 of a protocol TS 38.300 assigns a QoS Flow ID to each QoS flow of a Protocol Data Unit Session (PDU Session). In some embodiments of the present disclosure, the first identifier of the target quality-of-service flow may be referred to as QoS Flow ID 1, and may be referred to as $QFI_1$ for short.

Step 12: creating a second identifier of the target quality-of-service flow according to the first identifier of the target quality-of-service flow; wherein, a length of the second identifier of the target quality-of-service flow is less than or equal to a length of the first identifier of the target quality-of-service flow.

Optionally, in some embodiments of the present disclosure, the second identifier of the target quality-of-service flow is an offset of an index of a quality-of-service flow mapped to a same DRB within the DRB. The second identifier of the target quality-of-service flow may be referred to as QoS Flow ID 2, and may be referred to as $QFI_2$ for short.

In some embodiments of the present disclosure, there is a mapping relationship between the first identifier $QFI_1$ of the target quality-of-service flow and the second identifier $QFI_2$ of the target quality-of-service flow, that is, the $QFI_1$ may be mapped uniquely to the $QFI_2$, and the $QFI_2$ may also be mapped uniquely to the $QFI_1$.

A QoS Flow in a protocol in the related art is configured with only one identifier, that is, QoS Flow ID, which may be referred to as QFI for short. The $QFI_1$ in some embodiments of the present disclosure is the same as the QFI in the protocol in the related art, so there is no need to reconfigure or modify the related configuration of the protocol in the related art. However, the $QFI_2$ is not configured in the protocol in the related art, so in some embodiments of the present disclosure, the protocol in the related art needs to be modified accordingly. Specifically, the $QFI_2$ may be configured in the SDAP-Config of the protocol in the related art, and a definition and a value range of the $QFI_2$ may be configured. Specific content in the protocol will not be detailed here.

Further, because a maximum value of the QFI is not defined in the protocol in the related art, "xx" is used instead, that is, a value range of the QFI defined in the protocol in the related art is from 0 to xx. In some embodiments of the present disclosure, the maximum value of the QFI in the protocol in the related art is defined, and 'xx' is defined to a maximum value of the second identifier $QFI_2$ of the target quality-of-service flow. That is, a value range of the second identifier $QFI_2$ of the target quality-of-service flow is from 0 to m−1, wherein m is a maximum number of quality-of-service flows capable of being carried on the DRB mapped with the target quality-of-service flow. For example, the maximum number of QoS Flows capable of being carried on one DRB is 8, and a value range of the second identifier $QFI_2$ of the target quality-of-service flow is from 0 to 7.

Continuing the previous example, in some embodiments of the present disclosure, the value range of the second identifier $QFI_2$ of the target quality-of-service flow is defined. Correspondingly, the maximum number of quality-of-service flows capable of being carried on one DRB may be configured by modifying the protocol in the related art. Specifically, maxNrofQFIs is not defined in the protocol in the related art. In some embodiments of the present disclosure, the maxNrofQFIs is defined as the above parameter m and used to identify the maximum number of QoS Flows capable of being carried on one DRB.

Specifically, Step 11 in the above embodiment of the present disclosure includes: receiving a service data unit (SDU) sent by a first device; determining an identifier of a target quality-of-service flow carrying the SDU as the first identifier of the target quality-of-service flow.

Optionally, the method of processing the quality-of-service flow provided in some embodiments of the present disclosure is specifically applied to a transmitting-end device in a SDAP layer. The transmitting-end device receives a SDAP SDU from a QoS Flow in an upper layer, and an ID of the QoS Flow is the first identifier $QFI_1$ of the target quality-of-service flow.

Further, Step 12 in the above embodiment of the present disclosure includes: creating the second identifier $QFI_2$ of the target quality-of-service flow according to the first identifier $QFI_1$ of the target quality-of-service flow, an identifier DRB_ID of a DRB mapped with the target quality-of-service flow and a maximum number $Max\_QoSFlow\_NuM_{per\_DRB}$ of quality-of-service flows capable of being carried on the DRB mapped with the target quality-of-service flow.

That is, $QFI_2 = f(DRB\_ID, Max\_QoSFlow\_NuM_{per\_DRB}, QFI_1)$

In some embodiments of the present disclosure, there is a constraint relationship among the $QFI_1$, the DRB_ID the $Max\_QoSFlow\_NuM_{per\_DRB}$, and the $QFI_2$, one $QFI_2$ may be mapped uniquely through the $QFI_1$, the DRB_ID, and the $Max\_QoSFlow\_NuM_{per\_DRB}$.

Optionally, the DRB_ID refers to an ID of each DRB in an access network, that is, DRB-Identity in a protocol in the related art. The value range of the DRB_ID is INTEGER (1 . . . 32).

The $Max\_QoSFlow\_NuM_{per\_DRB}$ specifically refers to the maximum number of QoS Flows capable of being carried on one DRB, that is, the maximum number of QoS Flows capable of being mapped to the same DRB. The $Max\_QoSFlow\_NuM_{per\_DRB}$ is a newly defined parameter, which has the same meaning as the m and may be clearly defined in the protocol. A definition approach thereof is the same as that of the m, and will not be repeated here. Because the terminal side is configured by a signaling from the network side, the network side allocates the $QFI_1$ and the $QFI_2$ according to the mapping relationship. Range data available for each segment is the Max_QoSFlow_$Num_{per\_DRM}$, and then the Max_QoSFlow_$Num_{per\_DRB}$ is configured to the terminal.

Further, some embodiments of the present disclosure further provide a calculation formula of the second identifier $QFI_2$ of the target quality-of-service flow. Specifically, the second identifier $QFI_2$ of the target quality-of-service flow is created according to a first formula; wherein, the first formula is:

$$QFI_2 = QFI_1 - DRB\_ID * \text{Max\_QoSFlow\_Num}_{per\_DRB};$$

wherein, the $QFI_2$ is the second identifier of the target quality-of-service flow; the $QFI_1$ is the first identifier of the target quality-of-service flow; the Max_QoSFlow_$NUM_{per\_DRB}$ is the maximum number of the quality-of-service flows capable of being carried on the DRB mapped with the target quality-of-service flow; the DRB_ID is the identifier of the DRB mapped with the target quality-of-service flow.

It should be noted that, in some embodiments of the present disclosure, after the transmitting-end device in the SDAP layer receives the SDAP SDU from a target QoS Flow in the upper layer, only the ID of the QoS Flow, i.e., the first target quality-of-service flow Identify $QFI_1$, may be determined generally. In a case that the second identifier $QFI_2$ of the target quality-of-service flow is determined based on the first formula, the identifier DRB_ID of the DRB mapped with the target quality-of-service flow also needs to be known (the Max_QoSFlow_$NuM_{per\_DRB}$ may be acquired from a protocol). Therefore, some embodiments of the present disclosure also provide a method for quickly calculating the second identifier $QFI_2$ of the target quality-of-service flow. Specifically, Step 12 includes: creating the second identifier of the target quality-of-service flow according to a second formula, wherein the second formula is:

$$QFI_2 = QFI_1 \% \text{ Max\_QosFlow\_Num}_{per\_DRB};$$

wherein, the $QFI_2$ is the second identifier of the target quality-of-service flow; the $QFI_1$ is the first identifier of the target quality-of-service flow; the Max_QoSFlow_$NuM_{per\_DRB}$ is a maximum number of quality-of-service flows capable of being carried on a DRB mapped with the target quality-of-service flow; the "%" represents a remainder operation.

For example, the $QFI_1$ is 13, the Max_QoSFlow_$NuM_{per\_DRB}$ is 4, then the $QFI_2 = 13\%4 = 1$.

It should be noted that, in some embodiments of the present disclosure, for the same $QFI_1$, the same Max_QoSFlow_$NuM_{per\_DRB}$, and the same DRB_ID, whether the $QFI_2$ is calculated based on the first formula or the $QFI_2$ is calculated based on the second formula, calculation results thereof are the same.

Further, in some embodiments of the present disclosure, after Step 11, the method further includes: determining an identifier of a DRB mapped with the target quality-of-service flow according to the first identifier of the target quality-of-service flow; determining the DRB mapped with the target quality-of-service flow according to the identifier of the DRB mapped with the target quality-of-service flow, and sending a Protocol Data Unit (PDU) to a second device on the DRB mapped with the target quality-of-service flow.

In some embodiment of the present disclosure, after the first identifier $QFI_1$ of the target quality-of-service flow is determined by the transmitting-end device in the SDAP layer, the $QFI_1$ is needed to be mapped to the corresponding DRB, and a PDU is formed, and then the PDU is sent to a second device (a lower layer) through the mapped DRB.

Optionally, the PDU carries header information, and the header information includes the second identifier of the target quality-of-service flow; or, the PDU does not carry header information, but there is a preset mapping relationship between the PDU and the second identifier of the target quality-of-service flow.

Further, in some embodiments of the present disclosure, determining the identifier of the DRB mapped with the target quality-of-service flow according to the first identifier of the target quality-of-service flow includes: determining the identifier DRB_ID of the DRB mapped with the target quality-of-service flow according to the first identifier $QFI_1$ of the target quality-of-service flow, the second identifier $QFI_2$ of the target quality-of-service flow and the maximum number Max_QoSFlow_$Num_{per\_DRB}$ of quality-of-service flows capable of being carried on a DRB mapped to the target quality-of-service flow.

That is, $DRB\_ID = f(QFI_1, \text{Max\_QoSFlow\_Num}_{per\_DRB}, QFI_2)$;

In some embodiments of the present disclosure, there is a constraint relationship among the $QFI_1$, the DRB_ID, the Max_QoSFlow_$Num_{per\_DRB}$, and the $QFI_2$, only one DRB_ID may be uniquely mapped through the $QFI_1$, the $QFI_2$, and the Max_QoSFlow_$Num_{per\_DRB}$.

Further, some embodiments of the present disclosure provide a calculation formula for calculating the identifier DRB_ID of the DRB mapped with the target quality-of-service flow. Specifically, the identifier DRB_ID of the DRB mapped with the target quality-of-service flow is determined according to a third formula; wherein, the third formula is:

$$DRB\_ID = QFI_1 - QFI_2 / \text{Max\_QoSFlow\_Num}_{per\_DRB};$$

wherein, the DRB_ID is the identifier of the DRB mapped with the target quality-of-service flow; the $QFI_2$ is the second identifier of the target quality-of-service flow; the $QFI_1$ is the first identifier of the target quality-of-service flow; the Max_QoSFlow_$Num_{per\_DRB}$ is the maximum number of the quality-of-service flows capable of being carried on the DRB mapped with the target quality-of-service flow.

It should be noted that, in some embodiments of the present disclosure, after the transmitting-end device in the SDAP layer receives the SDAP SDU from the target QoS Flow in the upper layer, only the ID of the QoS Flow, i.e., the first target quality-of-service flow Identify $QFI_1$, may be determined generally. In a case that the identifier DRB_ID of the DRB mapped with the target quality-of-service flow is determined based on the third formula, the second identifier $QFI_2$ of the target quality-of-service flow also needs to be known (the Max_QoSFlow_$Num_{per\_DRB}$ may be acquired from a protocol). Therefore, some embodiments of the present disclosure also provide a method for quickly calculating the identifier DRB_ID of the DRB mapped with the target quality-of-service flow. Specifically, determining the identifier of the DRB mapped with the target quality-of-service flow according to the first identifier of the target quality-of-service flow includes: determining the identifier of the DRB mapped with the target quality-of-service flow according to a fourth formula, wherein the fourth formula is:

$$DRB\_ID = \lfloor QFI_1 \div \text{Max\_QoSFlow\_Num}_{per\_DRB} \rfloor;$$

wherein, the DRB_ID is the identifier of the DRB mapped with the target quality-of-service flow; the $QFI_1$ is the first identifier of the target quality-of-service flow; the $Max\_QoSFlow\_NuM_{per\_DRB}$ is a maximum number of quality-of-service flows capable of being carried on a DRB mapped with the target quality-of-service flow; the L represents a round-down operation.

For example, the $QFI_1$ is 13, the $Max\_QoSFlow\_NuM_{per\_DRB}$ is 4, then the $DRB\_ID=\lfloor 13 \div 4 \rfloor = 3$.

It should be noted that, in some embodiments of the present disclosure, for the same $QFI_1$, the same $Max\_QoSFlow\_NuM_{per\_DRB}$, and the same $QFI_2$, whether the DRB_ID is calculated based on the third formula or the DRB_ID is calculated based on the fourth formula, calculation results thereof are the same.

In summary, in some embodiments of the present disclosure, after the SDAP SDU is received by the transmitting-end device in the SDAP layer from the QoS Flow in the upper-layer, the $QFI_2$ and the DRB_ID are acquired based on the QoS Flow ID (i.e., the $QFI_1$) through the second formula and the fourth formula respectively; due to the configuration of the second identifier of the target quality-of-service flow, the length of the identifier of the target quality-of-service flow may be reduced, and an overhead of a header of the SDAP PDU may be further reduced.

Figure 2:
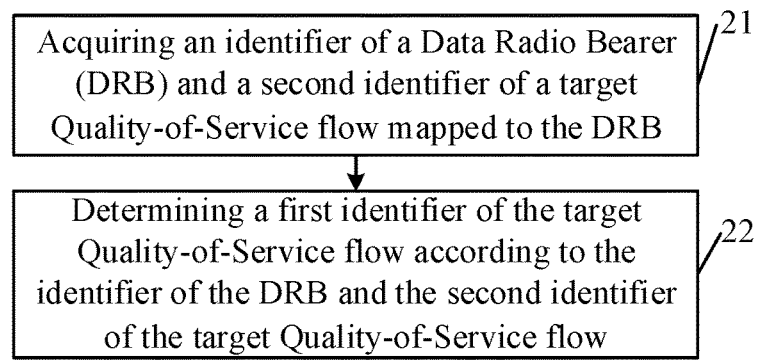
FIG. 2 is a second schematic flowchart illustrating steps of a method of processing a quality-of-service flow provided in some embodiments of the present disclosure.

As shown in FIG. 2, a method of processing a quality-of-service flow is further provided in some embodiments of the present disclosure, and the method includes steps 21-22.

Step 21: acquiring an identifier of a Data Radio Bearer (DRB) and a second identifier of a target quality-of-service flow mapped to the DRB.

Step 22: determining a first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow.

Optionally, the first identifier of the target quality-of-service flow is an identifier allocated by a core network for the target quality-of-service flow. A non-access stratum (NAS) level described in Section 12 of a protocol TS 38.300 assigns a QoS Flow ID to each QoS flow of a Protocol Data Unit Session (PDU Session). In some embodiments of the present disclosure, the first identifier of the target quality-of-service flow may be referred to as QoS Flow ID 1, and may be referred to as $QFI_1$ for short.

The second identifier of the target quality-of-service flow is an offset of an index of a quality-of-service flow mapped to a same DRB within the DRB. The second identifier of the target quality-of-service flow may be referred to as QoS Flow ID 2, and may be referred to as $QFI_2$ for short.

In some embodiments of the present disclosure, there is a mapping relationship between the first identifier $QFI_1$ of the target quality-of-service flow and the second identifier $QFI_2$ of the target quality-of-service flow, that is, the $QFI_1$ may be mapped uniquely to the $QFI_2$, and the $QFI_2$ may also be mapped uniquely to the $QFI_1$.

A QoS Flow in a protocol in the related art is configured with only one identifier, that is, a QoS Flow ID, which may be referred to as QFI for short. The $QFI_1$ in some embodiments of the present disclosure is the same as the QFI in the protocol in the related art, so there is no need to reconfigure or modify related configuration of the protocol in the related art. However, the $QFI_2$ is not configured in the protocol in the related art, therefore, in some embodiments of the present disclosure, the protocol in the related art needs to be modified accordingly. Specifically, the $QFI_2$ may be configured in the SDAP-Config of the protocol in the related art, and a definition and a value range of the $QFI_2$ may be configured. The specific content of the protocol will not be detailed here.

Further, because the maximum value of the QFI is not defined in the relevant protocol, "xx" is used instead, that is, the value range of the QFI defined in the protocol in the related technology is from 0 to xx. In some embodiments of the present disclosure, the maximum value of the QFI in the protocol in the related art is defined, and 'xx' is defined to be the maximum value of the second identifier $QFI_2$ of the target quality-of-service flow. That is, a value range of the second identifier $QFI_2$ of the target quality-of-service flow is from 0 to m−1, wherein the m is a maximum number of quality-of-service flows capable of being carried on the DRB mapped with the target quality-of-service flow. For example, the maximum number of QoS Flows capable of being carried on one DRB is 8, and a value range of the second identifier $QFI_2$ of the target quality-of-service flow is from 0 to 7.

Continuing the previous example, in some embodiments of the present disclosure, the value range of the second identifier $QFI_2$ of the target quality-of-service flow is defined. Correspondingly, the maximum number of quality-of-service flows capable of being carried on one DRB may be configured by modifying the protocol in the related art. Specifically, maxNrofQFIs is not defined in the protocol in the related art. In some embodiments of the present disclosure, the maxNrofQFIs is defined as the above parameter "m" and used to identify the maximum number of QoS Flows capable of being carried on one DRB.

Specifically, Step 21 in the embodiment of the present disclosure includes: receiving a Protocol Data Unit (PDU) sent by a third device; acquiring the identifier DRB_ID of the DRB carrying the PDU.

Optionally, the method of processing the quality-of-service flow is specifically applied to a receiving-end device in the SDAP layer. After the SDAP PDU is received by the receiving-end device from a lower-layer DRB, the DRB_ID of the lower-layer DRB is acquired.

Accordingly, Step 21 includes: parsing the PDU; determining, in a case that the PDU carries header information, an identifier of a quality-of-service flow included in the header information of the PDU as the second identifier $QFI_2$ of the target quality-of-service flow mapped to the DRB; searching, in a case that the PDU does not carry header information, an identifier of the quality-of-service flow corresponding to the PDU according to a preset mapping relationship, and determining the identifier of the quality-of-service flow corresponding to the PDU and the second identifier $QFI_2$ of the target quality-of-service flow mapped to the DRB. That is, the $QFI_2$ is queried from a preconfigured mapping rule.

Continuing the previous example, Step 22 in the embodiment of the present disclosure includes: determining the first identifier of the target quality-of-service flow according to the identifier of the DRB, the second identifier of the target quality-of-service flow and a maximum number of quality-of-service flows capable of being carried on the DRB.

That is, $QFI_1 = f(DRB\_ID, Max\_QoSFlow\_NuM_{per\_DRB}, QFI_2)$;

In some embodiments of the present disclosure, there is a constraint relationship among the $QFI_1$, the DRB_ID the $Max\_QoSFlow\_NuM_{per\_DRB}$, and the $QFI_2$, only one $QFI_1$ may be uniquely mapped through the DRB_ID the $Max\_QoSFlow\_NuM_{per\_DRB}$ and the $QFI_2$.

Optionally, the DRB_ID refers to an ID of each DRB in an access network, that is, DRB-Identity in the protocol in the related art. The value range of the DRB_ID is INTEGER (1 . . . 32).

The $Max\_QoSFlow\_NuM_{per\_DRB}$ specifically refers to the maximum number of QoS Flows capable of being carried on one DRB, that is, the maximum number of QoS Flows capable of being mapped to the same DRB. The $Max\_QoSFlow\_NuM_{per\_DRB}$ is a newly defined parameter, which has the same meaning as the m and may be clearly defined in the protocol. The definition approach thereof is the same as the m, and will not be repeated here. Because the terminal side is configured by a signaling from the network side, the network side allocates the $QFI_1$ and the $QFI_2$ according to the mapping relationship. Range data available for each segment is the $Max\_QoSFlow\_NuM_{per\_DRB}$, and then the $Max\_QoSFlow\_Num_{per\_DRB}$ is configured to the terminal.

Further, some embodiments of the present disclosure also provide a calculation formula for the first identifier $QFI_1$ of the target quality-of-service flow. Specifically, the first identifier of the target quality-of-service flow is determined according to a fifth formula; wherein, the fifth formula is:

$$QFI_1 = DRB\_ID * Max\_QoSFlow\_Num_{per\_DRB} + QFI_2;$$

wherein, the $QFI_1$ is the first identifier of the target quality-of-service flow; the DRB_ID is the identifier of the DRB; the $Max\_QoSFlow\_NuM_{per\_DRB}$ is the maximum number of the quality-of-service flows capable of being carried on the DRB; the $QFI_2$ is the second identifier of the target quality-of-service flow.

For example, the $Max\_QoSFlow\_Num_{per\_DRB}$ is 4, the DRB_ID is 3, the $QFI_2$ is 1, then the $QFI_1=3*4+1=13$.

Further, in some embodiments of the present disclosure, after Step 22, the processing method further includes: determining the target quality-of-service flow mapped to the DRB according to the first identifier of the target quality-of-service flow; sending a Service Data Unit (SDU) to a fourth device on the target quality-of-service flow.

In some embodiments of the present disclosure, after the first identifier $QFI_1$ of the target quality-of-service flow is determined by the receiving-end device in the SDAP layer, the parsed SDAP SDU carrying $QFI_1$ is sent to the upper layer or higher layer (the fourth device).

In summary, in some embodiments of the present disclosure, after the SDAP SDU is received by the receiving-end device in the SDAP layer from a lower-layer DRB, the $QFI_1$ is determined based on the DRB_ID and the $QFI_2$ through the fifth formula; due to the configuration of the second identifier of the target quality-of-service flow, the length of the identifier of the target quality-of-service flow may be reduced, and a header overhead of the SDAP PDU may be further reduced.

Figure 3:
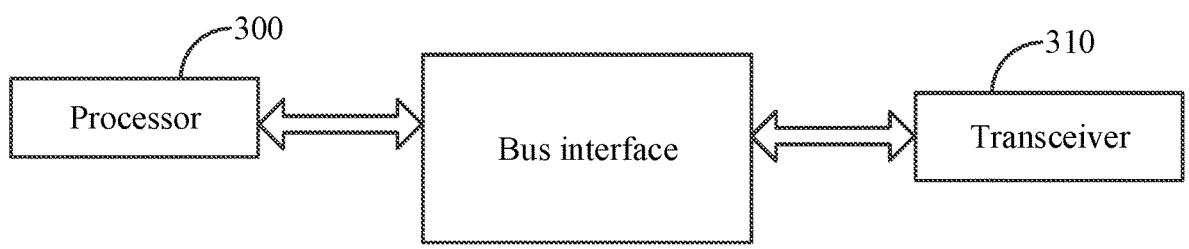
FIG. 3 is a schematic structural diagram illustrating a communication device provided in some embodiments of the present disclosure.

As shown in FIG. 3, some embodiments of the present disclosure further provide a communication device, and the communication device includes a processor 300 and a transceiver 310. The transceiver 310 is used to perform the following step: acquiring a first identifier of a target quality-of-service flow; the processor 300 is used to perform the following step: creating a second identifier of the target quality-of-service flow according to the first identifier of the target quality-of-service flow; wherein, a length of the second identifier of the target quality-of-service flow is less than or equal to a length of the first identifier of the target quality-of-service flow.

Optionally, in some embodiments of the present disclosure, the first identifier of the target quality-of-service flow is an identifier allocated by a core network for the target quality-of-service flow.

The second identifier of the target quality-of-service flow is an offset of an index of the quality-of-service flow mapped to a same DRB within the DRB.

Optionally, in some embodiments of the present disclosure, a value of the second identifier of the target quality-of-service flow ranges from 0 to m−1, the m is a maximum number of quality-of-service flows capable of being carried on the DRB mapped with the target quality-of-service flow.

Optionally, in some embodiments of the present disclosure, the transceiver 310 is further used to receive a service data unit (SDU) sent by a first device; the processor 300 is further used to determine an identifier of a target quality-of-service flow carrying the SDU as the first identifier of the target quality-of-service flow.

Optionally, in some embodiments of the present disclosure, the processor 300 is further used to create the second identifier of the target quality-of-service flow according to the first identifier of the target quality-of-service flow, an identifier of a DRB mapped with the target quality-of-service flow and a maximum number of quality-of-service flows capable of being carried on the DRB mapped with the target quality-of-service flow.

Optionally, in some embodiments of the present disclosure, the processor 300 is further used to create the second identifier of the target quality-of-service flow according to a first formula, wherein the first formula is:

$$QFI_2 = QFI_1 - DRB\_ID * Max\_QoSFlow\_Num_{per\_DRB};$$

wherein, the $QFI_2$ is the second identifier of the target quality-of-service flow; the $QFI_1$ is the first identifier of the target quality-of-service flow; the $Max\_QoSFlow\_Num_{per\_DRB}$ is the maximum number of quality-of-service flows capable of being carried on the DRB mapped with the target quality-of-service flow; the DRB_ID is the identifier of the DRB mapped with the target quality-of-service flow.

Optionally, in some embodiments of the present disclosure, the processor 300 is further used to create the second identifier of the target quality-of-service flow according to a second formula, wherein the second formula is:

$$QFI_2 = QFI_1 \% \ Max\_QosFlow\_Num_{per\_DRB}$$

wherein, the $QFI_2$ is the second identifier of the target quality-of-service flow; the $QFI_1$ is the first identifier of the target quality-of-service flow; the $Max\_QoSFlow\_NuM_{per\_DRB}$ is a maximum number of quality-of-service flows capable of being carried on a DRB mapped with the target quality-of-service flow; the "%" represents a remainder operation.

Optionally, in some embodiments of the present disclosure, the processor 300 is further used to determine an identifier of a DRB mapped with the target quality-of-service flow according to the first identifier of the target quality-of-service flow; determine the DRB mapped with the target quality-of-service flow according to the identifier of the DRB mapped with the target quality-of-service flow, and send a Protocol Data Unit (PDU) to a second device on the DRB mapped with the target quality-of-service flow.

Optionally, in some embodiments of the present disclosure, the PDU carries header information, and the header information includes the second identifier of the target quality-of-service flow; or, the PDU does not carry header information, but there is a preset mapping relationship between the PDU and the second identifier of the target quality-of-service flow.

Optionally, in some embodiments of the present disclosure, the processor 300 is further used to determine the identifier of the DRB mapped with the target quality-of-service flow according to the first identifier of the target quality-of-service flow, the second identifier of the target quality-of-service flow and the maximum number of quality-of-service flows capable of being carried on a DRB mapped with the target quality-of-service flow.

Optionally, in some embodiments of the present disclosure, the processor 300 is further used to determine the identifier of the DRB mapped with the target quality-of-service flow according to a third formula, wherein the third formula is:

$$DRB\_ID = QFI_1 - QFI_2/\text{Max\_QoSFlow\_Num}_{per\_DRB};$$

wherein, the DRB_ID is the identifier of the DRB mapped with the target quality-of-service flow; the $QFI_2$ is the second identifier of the target quality-of-service flow; the $QFI_1$ is the first identifier of the target quality-of-service flow; the $\text{Max\_QoSFlow\_NuM}_{per\_DRB}$ is the maximum number of quality-of-service flows capable of being carried on the DRB mapped with the target quality-of-service flow.

Optionally, in some embodiments of the present disclosure, the processor 300 is further used to determine the identifier of the DRB mapped with the target quality-of-service flow according to a fourth formula, wherein the fourth formula is:

$$DRB\_ID = \lfloor QFI_1 \div \text{Max\_QoSFlow\_Num}_{per\_DRB} \rfloor;$$

wherein, the DRB_ID is the identifier of the DRB mapped with the target quality-of-service flow; the $QFI_1$ is the first identifier of the target quality-of-service flow; the $\text{Max\_QoSFlow\_NuM}_{per\_DRB}$ is the maximum number of quality-of-service flows capable of being carried on a DRB mapped with the target quality-of-service flow; the $\lfloor \ \rfloor$ represents a round-down operation.

In summary, in some embodiments of the present disclosure, after the SDAP SDU is received by the transmitting-end device in the SDAP layer from the QoS Flow in an upper layer, the $QFI_2$ and the DRB_ID are acquired respectively based on the QoS Flow ID (i.e., the $QFI_1$) through the second formula and the fourth formula; due to the configuration of the second identifier of the target quality-of-service flow, the length of the identifier of the target quality-of-service flow may be reduced, and a header overhead of the SDAP PDU may be further reduced.

It should be noted that the communication device provided in some embodiments of the present disclosure is a communication device capable of performing the method of processing the quality-of-service flow, then all the embodiments of the method of processing the quality-of-service flow are applicable to the communication device, and the same or similar beneficial effect may be achieved.

As shown in FIG. 3, some embodiments of the present disclosure further provide a communication device, and the communication device includes a processor 300 and a transceiver 310. The transceiver 310 is used to perform the following step: acquiring an identifier of a Data Radio Bearer (DRB) and a second identifier of a target quality-of-service flow mapped to the DRB. The processor 300 is used to perform the following steps: determining a first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow.

Optionally, in some embodiments of the present disclosure, the first identifier of the target quality-of-service flow is an identifier allocated by a core network for the target quality-of-service flow.

The second identifier of the target quality-of-service flow is an offset of an index of a quality-of-service flow mapped to a same DRB within the DRB.

Optionally, in some embodiments of the present disclosure, a value of the second identifier of the target quality-of-service flow ranges from 0 to m−1, the m is a maximum number of quality-of-service flows capable of being carried on the DRB mapped with the target quality-of-service flow.

Optionally, in some embodiments of the present disclosure, the transceiver 310 is further used to receive a Protocol Data Unit (PDU) sent by a third device. The processor 300 is used to acquire the identifier of the DRB carrying the PDU.

Optionally, in some embodiments of the present disclosure, the processor 300 is further used to parse the PDU; determine, in a case that the PDU carries header information, an identifier of a quality-of-service flow included in the header information of the PDU as the second identifier of the target quality-of-service flow mapped to the DRB; search, in a case that the PDU does not carry header information, an identifier of a quality-of-service flow corresponding to the PDU according to a preset mapping relationship, and determining the identifier of the quality-of-service flow corresponding to the PDU as the second identifier of the target quality-of-service flow mapped to the DRB.

Optionally, in some embodiments of the present disclosure, the processor 300 is further used to determine the first identifier of the target quality-of-service flow according to the identifier of the DRB, the second identifier of the target quality-of-service flow and a maximum number of quality-of-service flows capable of being carried on the DRB.

Optionally, in some embodiments of the present disclosure, the processor 300 is further used to determine the first identifier of the target quality-of-service flow according to a fifth formula, wherein the fifth formula is:

$$QFI_1 = DRB\_ID * \text{Max\_QoSFlow\_Num}_{per\_DRB} + QFI_2;$$

wherein, the $QFI_1$ is the first identifier of the target quality-of-service flow; the DRB_ID is the identifier of the DRB; the $\text{Max\_QoSFlow\_NuM}_{per\_DRB}$ is the maximum number of the quality-of-service flows capable of being carried on the DRB; the $QFI_2$ is the second identifier of the target quality-of-service flow.

Optionally, in some embodiments of the present disclosure, the processor 300 is further used to determine the target quality-of-service flow mapped to the DRB according to the first identifier of the target quality-of-service flow. The transceiver is further used to send a Service Data Unit (SDU) to a fourth device on the target quality-of-service flow.

In summary, in some embodiments of the present disclosure, after the SDAP SDU is received by the receiving-end device in the SDAP layer from a lower-layer DRB, the $QFI_1$ is determined based on the DRB_ID and the $QFI_2$ through the fifth formula; due to the configuration of the second identifier of the target quality-of-service flow, the length of the identifier of the target quality-of-service flow may be reduced, and a header overhead of the SDAP PDU may be further reduced.

It should be noted that the communication device provided in some embodiments of the present disclosure is a communication device capable of performing the method of processing the quality-of-service flow, then all the embodiments of the method of processing the quality-of-service flow are applicable to the communication device, and the same or similar beneficial effect may be achieved.

Some embodiments of the present disclosure further provide a base station, the base station includes a storage, a processor and a computer program stored on the storage and executable by the processor, wherein the computer program is executed by the processor to implement various processes in the foregoing embodiments of the method of processing the quality-of-service flow described as above, and the same technical effect may be achieved, which will not be repeated herein to avoid repetition.

Some embodiments of the present disclosure also provide a computer readable storage medium, a computer program is stored on the computer readable storage medium, and the computer program is performed by a processor to implement various processes in the embodiments of the method of processing the quality-of-service flow described as above, and the same technical effect may be achieved, which will not be repeated herein to avoid repetition. The computer readable storage medium may be, for example, a Read-Only Memory (ROM), a Random Access Memory (RAM), a magnetic disk or an optical disk, etc.

Those skilled in the art will appreciate that the embodiments of the present application may be provided as a method, a system, or a computer program product. Accordingly, the present application may take forms of an entire hardware embodiment, an entire software embodiment, or an embodiment combining software and hardware aspects. Moreover, the present application may take the form of a computer program product to be carried out on one or more computer readable storage medium (including but not limit to a disk memory and an optical memory etc.) including computer executable program codes.

The present application is described with reference to flowchart illustrations and/or block diagrams of methods, devices (systems) and computer program products according to the embodiments of the application. It will be understood that each flow and/or block in flowcharts and/or block diagrams and a combination of the flows and/or the blocks in the flowcharts and/or block diagrams may be implemented by computer program instructions. These computer program instructions can be provided to a processor of a general purpose computer, a special purpose computer, an embedded processor or other programmable data processing device to produce a machine, so that a device for implementing functions designated in one or more flows of the flowcharts and/or in one or more blocks may be implemented by instructions executed by a processor of a computer or other programmable data processing device.

The computer program instructions may also be stored in a computer readable storage that can direct a computer or other programmable data processing devices to operate in a particular manner, such that instructions stored in the computer readable storage medium produce an article of manufacture including a device of instructions, and the device of instructions implements functions designated in one or more flows of the flowcharts or in one or more blocks of the block diagrams. These computer program instructions may also be loaded onto a computer or other programmable data processing devices such that a series of operational steps are performed on the computer or other programmable devices to produce a computer-implemented processing, such that the instructions executed on a computer or other programmable device provide steps for implementing the functions designated in one or more flows of the flowcharts or in one or more blocks of the block diagrams.

The descriptions above are optional embodiments of the disclosure, it should be noted that the improvements and the embellishments may be made by one of ordinary skills in the art without departing from the protection scope of the present disclosure, and the improvements and the embellishments are also within the protection scope of the present disclosure.

What is claimed is:

1. A method of processing a quality-of-service flow, comprising:

acquiring a first identifier of a target quality-of-service flow;

creating a second identifier of the target quality-of-service flow according to the first identifier of the target quality-of-service flow; wherein, a length of the second identifier of the target quality-of-service flow is less than or equal to a length of the first identifier of the target quality-of-service flow;

wherein, the first identifier of the target quality-of-service flow is an identifier allocated by a core network for the target quality-of-service flow;

the second identifier of the target quality-of-service flow is an offset of an index of a quality-of-service flow mapped to a same Data Radio Bearer (DRB) within the DRB.

2. The method according to claim 1, wherein, a value of the second identifier of the target quality-of-service flow ranges from 0 to m-1, and m is a maximum quantity of quality-of-service flows capable of being carried on a Data Radio Bearer (DRB) mapped with the target quality-of-service flow.

3. The method according to claim 1, wherein, acquiring the first identifier of the target quality-of-service flow comprises:

receiving a Service Data Unit (SDU) sent by a first device;

determining an identifier of a target quality-of-service flow carrying the SDU as the first identifier of the target quality-of-service flow.

4. The method according to claim 1, wherein, creating the second identifier of the target quality-of-service flow according to the first identifier of the target quality-of-service flow comprises:

creating the second identifier of the target quality-of-service flow according to the first identifier of the target quality-of-service flow, an identifier of a Data Radio Bearer (DRB) mapped with the target quality-of-service flow, and a maximum quantity of quality-of-service flows capable of being carried on the DRB mapped with the target quality-of-service flow.

5. The method according to claim 4, wherein, creating the second identifier of the target quality-of-service flow according to the first identifier of the target quality-of-service flow, the identifier of the DRB mapped with the target quality-of-service flow and the maximum quantity of the quality-of-service flows capable of being carried on the DRB mapped with the target quality-of-service flow comprises:

creating the second identifier of the target quality-of-service flow according to a first formula, wherein the first formula is:

$$QFI_2 = QFI_1 - DRB\_ID * \text{Max\_QoSFlow\_Num}_{per\_DRB};$$

wherein, the $QFI_2$ is the second identifier of the target quality-of-service flow; the $QFI_1$ is the first identifier of the target quality-of-service flow; the $\text{Max\_QoSFlow\_Num}_{per\_DRB}$ is the maximum quantity of the quality-of-service flows capable of being carried on the DRB mapped with the target quality-of-service flow; the DRB_ID is the identifier of the DRB mapped with the target quality-of-service flow.

6. The method according to claim 1, wherein, creating the second identifier of the target quality-of-service flow according to the first identifier of the target quality-of-service flow comprises:

creating the second identifier of the target quality-of-service flow according to a second formula, wherein the second formula is:

$$QFI_2 = QFI_1 \% \text{Max\_QosFlow\_Num}_{per\_DRB};$$

wherein, the $QFI_2$ is the second identifier of the target quality-of-service flow; the $QFI_1$ is the first identifier of the target quality-of-service flow; the $\text{Max\_QoSFlow\_Num}_{per\_DRB}$ is a maximum quantity of quality-of-service flows capable of being carried on a Data Radio Bearer (DRB) mapped with the target quality-of-service flow; % represents a remainder operation.

7. The method according to claim 1, further comprising: after creating the second identifier of the target quality-of-service flow according to the first identifier of the target quality-of-service flow, determining an identifier of a Data Radio Bearer (DRB) mapped with the target quality-of-service flow according to the first identifier of the target quality-of-service flow, determining the DRB mapped with the target quality-of-service flow according to the identifier of the DRB mapped with the target quality-of-service flow, sending a Protocol Data Unit (PDU) to a second device on the DRB mapped with the target quality-of-service flow.

8. The method according to claim 7, wherein, the PDU carries header information, and the header information comprises the second identifier of the target quality-of-service flow; or the PDU does not carry header information, but there is a preset mapping relationship between the PDU and the second identifier of the target quality-of-service flow; or, determining the identifier of the DRB mapped with the target quality-of-service flow according to the first identifier of the target quality-of-service flow comprises:

determining the identifier of the DRB mapped with the target quality-of-service flow according to a fourth formula, wherein the fourth formula is:

$$DRB\_ID = \lfloor QFI_1 \div \text{Max\_QoSFlow\_Num}_{per\_DRB} \rfloor;$$

wherein, the DRB_ID is the identifier of the DRB mapped with the target quality-of-service flow; the $QFI_1$ is the first identifier of the target quality-of-service flow; the $\text{Max\_QoSFlow\_Num}_{per\_DRB}$ is a maximum quantity of quality-of-service flows capable of being carried on a Data Radio Bearer (DRB) mapped with the target quality-of-service flow; the $\lfloor \ \rfloor$ represents a round-down operation.

9. The method according to claim 7, wherein, determining the identifier of the DRB mapped with the target quality-of-service flow according to the first identifier of the target quality-of-service flow comprises:

determining the identifier of the DRB mapped with the target quality-of-service flow according to the first identifier of the target quality-of-service flow, the second identifier of the target quality-of-service flow and a maximum quantity of quality-of-service flows capable of being carried on a DRB mapped with the target quality-of-service flow.

10. The method according to claim 9, wherein, determining the identifier of the DRB mapped with the target quality-of-service flow according to the first identifier of the target quality-of-service flow, the second identifier of the target quality-of-service flow and the maximum quantity of the quality-of-service flows capable of being carried on the DRB mapped with the target quality-of-service flow comprises:

determining the identifier of the DRB mapped with the target quality-of-service flow according to a third formula, wherein the third formula is:

$$DRB\_ID = QFI_1 - QFI_2 / \text{Max\_QoSFlow\_Num}_{per\_DRB};$$

wherein, the DRB_ID is the identifier of the DRB mapped with the target quality-of-service flow; the $QFI_2$ is the second identifier of the target quality-of-service flow; the $QFI_1$ is the first identifier of the target quality-of-service flow; the $\text{Max\_QoSFlow\_Num}_{per\_DRB}$ is the maximum quantity of the quality-of-service flows capable of being carried on the DRB mapped with the target quality-of-service flow.

11. A communication device, comprising a storage, a processor, and a computer program stored on the storage and executable by the processor, wherein, in a case that the program is executed by the processor, the processor implements steps of the method of processing the quality-of-service flow according to claim 1.

12. A method of processing a quality-of-service flow, comprising:

acquiring an identifier of a Data Radio Bearer (DRB) and a second identifier of a target quality-of-service flow mapped to the DRB, wherein the second identifier of the target quality-of-service flow is created according to a first identifier of the target quality-of-service flow;

determining the first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow;

wherein, the first identifier of the target quality-of-service flow is an identifier allocated by a core network for the target quality-of-service flow;

the second identifier of the target quality-of-service flow is an offset of an index of a quality-of-service flow mapped to a same DRB within the DRB.

13. The method according to claim 12, wherein, a value of the second identifier of the target quality-of-service flow ranges from 0 to m-1, the m is a maximum quantity of quality-of-service flows capable of being carried on the DRB mapped to the target quality-of-service flow.

14. The method according to claim 12, wherein, acquiring the identifier of the DRB comprises:

receiving a Protocol Data Unit (PDU) sent by a third device;

acquiring an identifier of a DRB carrying the PDU.

15. The method according to claim 14, wherein, acquiring the second identifier of the target quality-of-service flow mapped to the DRB comprises:

parsing the PDU;

determining, in a case that the PDU carries header information, an identifier of a quality-of-service flow comprised in the header information of the PDU as the second identifier of the target quality-of-service flow mapped to the DRB;

searching, in a case that the PDU does not carry header information, an identifier of a quality-of-service flow corresponding to the PDU according to a preset mapping relationship, and determining the identifier of the quality-of-service flow corresponding to the PDU as the second identifier of the target quality-of-service flow mapped to the DRB.

16. The method according to claim 12, wherein, determining the first identifier of the target quality-of-service flow according to the identifier of the DRB and the second identifier of the target quality-of-service flow comprises:

determining the first identifier of the target quality-of-service flow according to the identifier of the DRB, the second identifier of the target quality-of-service flow and a maximum quantity of quality-of-service flows capable of being carried on the DRB.

17. The method according to claim 16, wherein, determining the first identifier of the target quality-of-service flow according to the identifier of the DRB, the second identifier of the target quality-of-service flow and the maximum quantity of the quality-of-service flows capable of being carried on the DRB comprises:

determining the first identifier of the target quality-of-service flow according to a fifth formula, wherein the fifth formula is:

$QFI_1 = DRB\_ID * \text{Max\_QoSFlow\_Num}_{per\_DRB} + QFI_2;$ wherein, the $QFI_1$ is the first identifier of the target quality-of-service flow; the DRB_ID is the identifier of the DRB; the $\text{Max\_QoSFlow\_Num}_{per\_DRB}$ is a maximum quantity of quality-of-service flows capable of being carried on the DRB; the $QFI_2$ is the second identifier of the target quality-of-service flow.

18. The method according to claim 12, further comprising: after determining the first identifier of the target quality-of-service flow according to the identifier of the DRB and the second identifier of the target quality-of-service flow, determining the target quality-of-service flow mapped to the DRB according to the first identifier of the target quality-of-service flow, sending a Service Data Unit (SDU) to a fourth device on the target quality-of-service flow.

19. A communication device, comprising a storage, a processor, and a computer program stored on the storage and executable by the processor, wherein, in a case that the program is executed by the processor, the processor implements steps of the method of processing the quality-of-service flow according to claim 12.

20. A communication device, comprising a processor and a transceiver, wherein the transceiver is used to perform a following process:

acquiring an identifier of a Data Radio Bearer (DRB) and a second identifier of a target quality-of-service flow mapped to the DRB, wherein the second identifier of the target quality-of-service flow is created according to a first identifier of the target quality-of-service flow;

the processor is used to perform a following process:

determining the first identifier of the target quality-of-service flow according to the identifier of the DRB and the second identifier of the target quality-of-service flow; wherein, a length of the second identifier of the target quality-of-service flow is less than or equal to a length of the first identifier of the target quality-of-service flow;

wherein, the first identifier of the target quality-of-service flow is an identifier allocated by a core network for the target quality-of-service flow;

the second identifier of the target quality-of-service flow is an offset of an index of a quality-of-service flow mapped to a same DRB within the DRB.

* * * * *